US009628352B2

(12) United States Patent
Xu (10) Patent No.: US 9,628,352 B2
(45) Date of Patent: Apr. 18, 2017

(54) METHOD, APPARATUS AND SYSTEM FOR DOWNLOADING FILE IN CONTENT DELIVERY NETWORK (71) Applicant: Huawei Technologies Co., Ltd., Shenzhen (CN)

(72) Inventor: Lei Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 667 days.

(21) Appl. No.: 14/145,481

(22) Filed: Dec. 31, 2013

(65) Prior Publication Data

US 2014/0115124 A1 Apr. 24, 2014

Related U.S. Application Data (63) Continuation of application No. PCT/CN2011/084275, filed on Dec. 20, 2011.

(51) Int. Cl.
H04L 12/24 (2006.01)
H04L 29/06 (2006.01)
H04L 29/08 (2006.01)

(52) U.S. Cl.
CPC ........ H04L 41/509 (2013.01); H04L 65/1083 (2013.01); H04L 65/4084 (2013.01); H04L 65/80 (2013.01); H04L 67/2842 (2013.01)

(58) Field of Classification Search
CPC .............. H04L 41/509; H04L 65/1083; H04L 65/4084; H04L 65/80; H04L 67/2842
See application file for complete search history.

(56) References Cited

U.S. PATENT DOCUMENTS

2002/0097727 A1* 7/2002 Prakash .............. H04L 12/5692
370/395.42
2011/0302618 A1* 12/2011 Odlund .............. H04N 21/2183
725/109
2012/0108250 A1* 5/2012 Ahn ...................... H04L 1/0002
455/450

FOREIGN PATENT DOCUMENTS

CN 1852229 A 10/2006
CN 101656756 A 2/2010
CN 101873355 A 10/2010
(Continued)

OTHER PUBLICATIONS

Partial English Translation and Abstract of Chinese Patent Application No. CN1852229A, Feb. 25, 2014, 5 pages.
(Continued)

Primary Examiner — Arvin Eskandarnia
Assistant Examiner — Gil H. Lee
(74) Attorney, Agent, or Firm — Conley Rose, P.C.

(57) ABSTRACT

A method, an apparatus and a system for downloading a file in a content delivery network are provided. A sending rate of a file fragment is determined according to a requirement for playing the file fragment, the sending rate of the file fragment is carried in a request message for downloading the file fragment, so that a content source server or an upper-level cache server can send the file fragment at the sending rate of the file fragment carried in the request message, which solves the problem in the prior art that, the upper-level cache server or the content source server fails to meet diversified downloading requirements of a lower-level cache server, and the lower-level cache server is capable of providing a flexible streaming service for a terminal apparatus, improving user experience.

17 Claims, 8 Drawing Sheets (56) References Cited

FOREIGN PATENT DOCUMENTS

CN  102118323 A  7/2011
WO  2005098674 A1  10/2005

OTHER PUBLICATIONS

Partial English Translation and Abstract of Chinese Patent Application No. CN102118323A, Feb. 25, 2014, 3 pages.
Foreign Communication From a Counterpart Application, PCT Application No. PCT/CN2011/084275, English Translation of International Search Report dated Sep. 20, 2012, 3 pages.
Foreign Communication From a Counterpart Application, PCT Application No. PCT/CN2011/084275, English Translation of Written Opinion dated Sep. 20, 2012, 10 pages.
Foreign Communication From a Counterpart Application, Chinese Application No. 201180003024.7, Chinese Office Action dated Apr. 3, 2015, 5 pages.
Foreign Communication From a Counterpart Application, Chinese Application No. 201180003024.7, Chinese Search Report dated Apr. 3, 2015, 2 pages.

* cited by examiner

METHOD, APPARATUS AND SYSTEM FOR DOWNLOADING FILE IN CONTENT DELIVERY NETWORK

CROSS-REFERENCE TO RELATED APPLICATION

This application is a continuation of International Application No. PCT/CN2011/084275, filed on Dec. 20, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of information technologies, and in particular, to a method, an apparatus and a system for downloading a file in a content delivery network.

BACKGROUND

A content delivery network (CDN) implements a distributive nearby service of content by publishing the content to a network edge. In the CDN, content cache servers are arranged on network nodes. A CDN center control system guides a user request to a best service node in real time according to information, such as network traffic, connection and load condition of the nodes and a distance to a user. For the user, using a CDN system shortens response time of a service request and improves stability of data transmission, which thereby improves network service quality.

In the CDN, a client sends a file request to a CDN edge cache server. After receiving the request, the CDN edge cache server determines whether the file is temporarily stored in a local server. If the file is temporarily stored in the local server, the CDN edge cache server directly sends the file to the client; if the file is not temporarily stored in the local server, the CDN edge cache server makes a request to a content source server or an upper-level cache server for obtaining the file, and after obtaining the file, forwards the file to the client.

Currently, a lower-level cache server makes a request to the upper-level cache server or the content source server for obtaining a target file. The upper-level cache server or the content source server sends a file fragment to the lower-level cache server at a preset sending rate of the file fragment, failing to meet diversified downloading requirements of the lower-level cache server, which thereby cannot provide the user with a flexible streaming service.

SUMMARY

Embodiments of the present invention provide a method, an apparatus and a system for downloading a file in a content delivery network, which are used to solve the problem that diversified downloading requirements of a lower-level cache server cannot be met in the prior art.

An embodiment of the present invention provides a method for downloading a file in a content delivery network, including: sending a request message for downloading a file fragment to a content source server or an upper-level cache server, where the request message carries a sending rate of the file fragment, and the sending rate of the file fragment is determined according to a requirement for playing the file fragment; and receiving the file fragment sent at the sending rate.

An embodiment of the present invention further provides a method for downloading a file in a content delivery network, including: receiving a request message for downloading a file fragment sent by a lower-level cache server, where the request message carries a sending rate of the file fragment, and the sending rate of the file fragment is determined by the lower-level cache server according to a requirement for playing the file fragment; and sending the file fragment at the sending rate.

An embodiment of the present invention further provides an apparatus for downloading a file in a content delivery network, including: a download request sending unit configured to send a request message for downloading a file fragment to a content source server or an upper-level cache server, where the request message carries a sending rate of the file fragment, and the sending rate of the file fragment is determined according to a requirement for playing the file fragment; and a content receiving unit configured to receive the file fragment sent at the sending rate.

An embodiment of the present invention further provides an apparatus for providing content in a content delivery network, including: a download request receiving unit configured to receive a request message for downloading a file fragment sent by a lower-level cache server, where the request message carries a sending rate of the file fragment, and the sending rate of the file fragment is determined by the lower-level cache server according to a requirement for playing the file fragment; and a content sending unit configured to send the file fragment at the sending rate.

An embodiment of the present invention further provides a system for downloading a file in a content delivery network, including: a file downloading apparatus and a content providing apparatus; where the file downloading apparatus is configured to send a request message for downloading a file fragment to the content providing apparatus, where the request message carries a sending rate of the file fragment, and the sending rate of the file fragment is determined according to a requirement for playing the file fragment; the content providing apparatus is configured to receive the request message for downloading the file fragment sent by the file downloading apparatus, and send the file fragment at the sending rate.

In the embodiments of the present invention, the sending rate of the file fragment is determined according to the requirement for playing the file fragment, the sending rate of the file fragment is carried in the request message for downloading the file fragment, so that the content source server or the upper-level cache server can send the file fragment at the sending rate of the file fragment carried in the request message, which solves the problem in the prior art that, the upper-level cache server or the content source server fails to meet diversified downloading requirements of the lower-level cache server. Therefore, the lower-level cache server is capable of providing a flexible streaming service for a terminal device, improving user experience.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

The following describes complete technical solutions of the method embodiments of the present invention.

Method Embodiment 1

Figure 1:
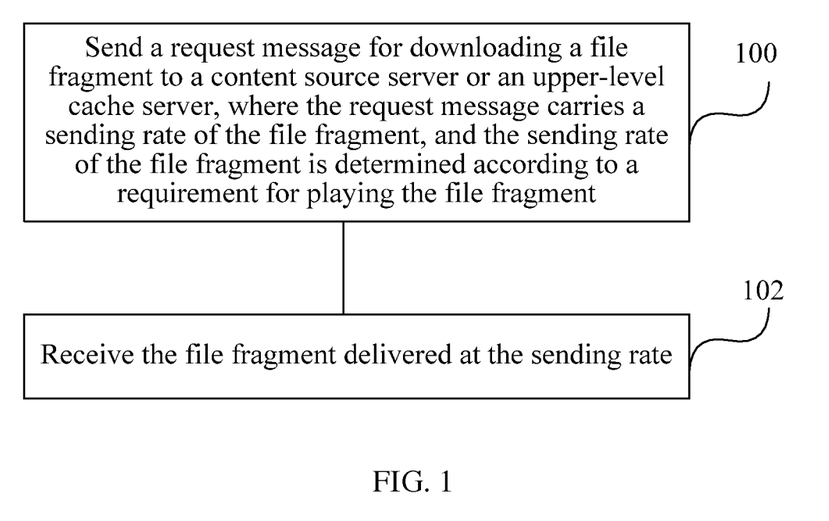
FIG. 1 is a schematic flow chart of an embodiment of a method for downloading a file in a content delivery network according to the embodiment of the present invention.

FIG. 1 is a schematic flow chart of an embodiment of a method for downloading a file in a content delivery network according to the embodiment of the present invention, and as shown in FIG. 1, the method according to the embodiment of the present invention includes the following steps.

Step 100: Send a request message for downloading a file fragment to a content source server or an upper-level cache server, where the request message carries a sending rate of the file fragment, and the sending rate of the file fragment is determined according to a requirement for playing the file fragment.

In the embodiment of the present invention, a manner for determining the sending rate of the file fragment includes: if on-demand popularity of the file fragment reaches a preset popularity value or the file fragment is used for playing buffering on a terminal device, determining the sending rate of the file fragment as an expected sending rate, where the expected sending rate is greater than a minimum sending rate of the file fragment; in addition, if the on-demand popularity of the file fragment does not reach the preset popularity value, and the file fragment is not used for playing buffering of the terminal device, using the minimum sending rate of the file fragment as the sending rate of the file fragment.

In the embodiment of the present invention, a manner in which the request message carries the sending rate of the file fragment includes: the request message carries the expected sending rate and the minimum sending rate of the file fragment; or the request message carries a segment sending rate of the file fragment; or the request message carries an expected segment sending rate, a minimum segment sending rate of the file fragment and the like.

Step 102: Receive the file fragment sent at the sending rate.

In the embodiment of the present invention, the sending rate of the file fragment is determined according to the requirement for playing the file fragment, the sending rate of the file fragment is carried in the request message for downloading the file fragment, so that the content source server or the upper-level cache server can send the file fragment at the sending rate of the file fragment carried in the request message, which solves the problem in the prior art that, the upper-level cache server or the content source server fails to meet diversified downloading requirements of a lower-level cache server. Therefore, the lower-level cache server is capable of providing a flexible streaming service for the terminal device, improving user experience.

Method Embodiment 2

Figure 2:
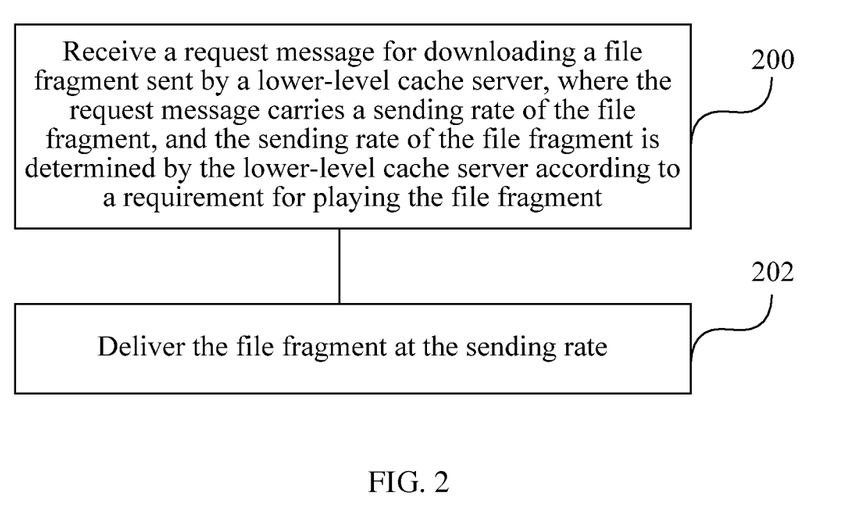
FIG. 2 is a schematic flow chart of another embodiment of a method for downloading a file in a content delivery network according to the embodiment of the present invention.

FIG. 2 is a schematic flow chart of another embodiment of a method for downloading a file in a content delivery network according to the embodiment of the present invention, and as shown in FIG. 2, the method according to the embodiment of the present invention includes the following steps.

Step 200: Receive a request message for downloading a file fragment sent by a lower-level cache server, where the request message carries a sending rate of the file fragment, and the sending rate of the file fragment is determined by the lower-level cache server according to a requirement for playing the file fragment.

In the embodiment of the present invention, a manner for determining the sending rate of the file fragment includes: if on-demand popularity of the file fragment reaches a preset popularity value or the file fragment is used for playing buffering on a terminal device, determining the sending rate of the file fragment as an expected sending rate, where the expected sending rate is greater than a minimum sending rate of the file fragment.

In addition, if the on-demand popularity of the file fragment does not reach the preset popularity value, and the file fragment is not used for playing buffering on the terminal device, the minimum sending rate of the file fragment is used as the sending rate of the file fragment.

In the embodiment of the present invention, a manner in which the request message carries the sending rate of the file fragment includes: the request message carries the expected sending rate and the minimum sending rate of the file fragment; or the request message carries a segment sending rate of the file fragment; or the request message carries an expected segment sending rate, a minimum segment sending rate of the file fragment and the like.

Step 202: Send the file fragment at the sending rate.

In the embodiment of the present invention, the request message for downloading the file fragment sent by the lower-level cache server is received, the request message carries the sending rate determined by the lower-level cache server according to the requirement for playing the file fragment, and the file fragment is sent at the sending rate of the file fragment carried in the request message, which meets diversified downloading requirements of the lower-level cache server. Therefore, the lower-level cache server is capable of providing a flexible streaming service for the terminal device, improving user experience.

To describe the technical solutions of the present invention more clearly, the following uses a CDN in a two-layer networking mode as an example to describe the technical solutions of the present invention in detail.

Method Embodiment 3

In the embodiment of the present invention, a terminal device makes a request to an edge cache server for downloading a "c" film. The edge cache server interacts with the terminal device and a content source server by adopting the Hyper Text Transfer Protocol (HTTP).

Figure 3:
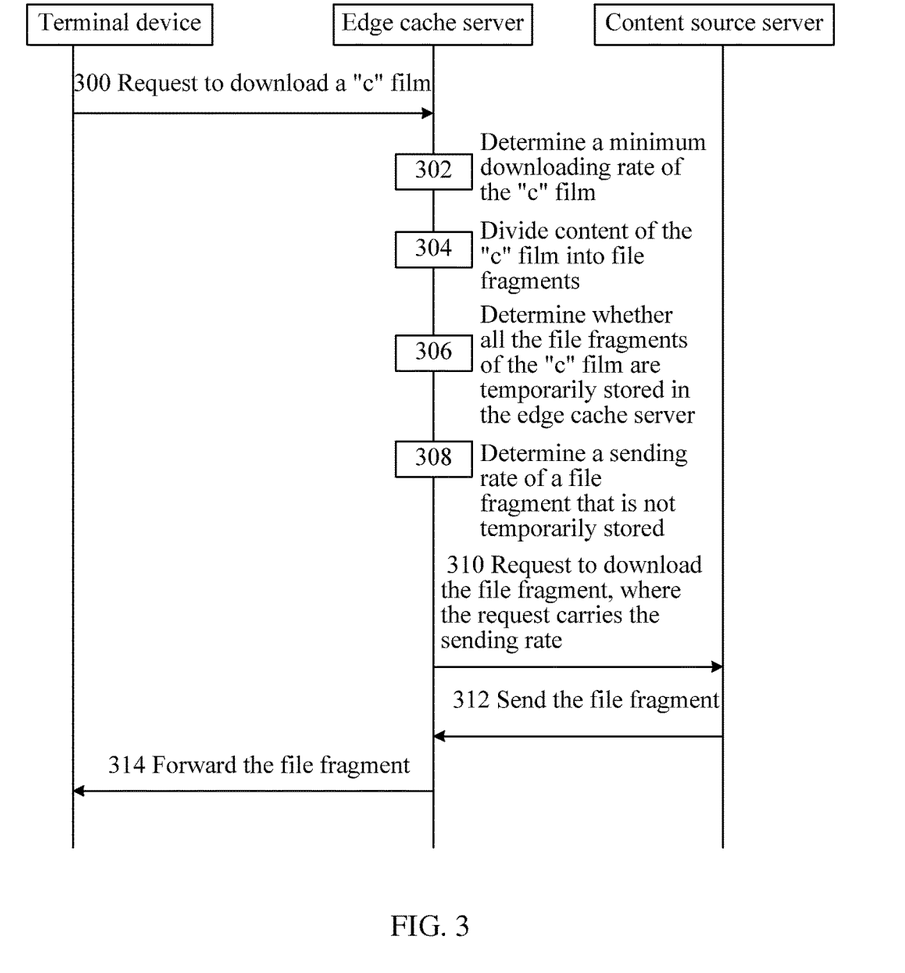
FIG. 3 is a schematic flow chart of another embodiment of a method for downloading a file in a content delivery network according to the embodiment of the present invention.

FIG. 3 is a schematic flow chart of another embodiment of a method for downloading a file in a content delivery network according to the embodiment of the present invention, and as shown in FIG. 3, the method according to the embodiment of the present invention includes the following steps.

Step 300: A terminal device makes a request to an edge cache server for downloading a "c" film.

The terminal device may send a download request message to the edge cache server to request to download the "c" film, such as:

GET http://movie.youku.com/480p/c.flv HTTP/1.1.

Step 302: The edge cache server determines a minimum downloading rate for the "c" film.

To ensure that the "c" film can be played continuously on the terminal device, a sending rate of the "c" film cannot be lower than the minimum sending rate of the film, otherwise, when the film is played on the terminal device, phenomena, such as picture freeze and pixelation, may occur, which affects user experience.

The edge cache server may determine the minimum sending rate of the "c" film in a preconfigured manner, for example, a download request message having a prefix of http://movie.youku.com/480p may be preconfigured on the edge cache server, and the minimum download rate for a file requested to be downloaded is 4 megabits per second (Mbps); or a download request message having a prefix of http://movie.youku.com/720p may be preconfigured on the edge cache server, and the minimum download rate for the file requested to be downloaded is 6 Mbps; or a download request message having a prefix of http://movie.youku.com/1080p may be preconfigured on the edge cache server, and the minimum download rate for the file requested to be downloaded is 8 Mbps. When receiving the download request message, the edge cache server may determine, by identifying the download request message, the minimum sending rate of the content requested to be downloaded by the terminal device.

Step 304: The edge cache server divides content of the "c" film into file fragments according to the download request of the "c" film.

The edge cache server may fragment the content of the "c" film according to a time length, or may also fragment the content of the "c" film according to a fixed byte size.

Step 306: The edge cache server determines whether all the file fragments of the "c" film are temporarily stored in the edge cache server.

Step 308: As for a file fragment of the "c" film that is not temporarily stored in the edge cache server, the edge cache server determines a sending rate of the file fragment.

Because before playing a film, the terminal device usually needs to temporarily store a part of the content of the film, to prevent a phenomenon of intermittent stop from occurring during playing on the terminal device. Therefore, the content to be downloaded is usually expected to be downloaded at a faster rate, so as to rapidly fill a buffer, and reduce program buffering time, thereby reducing time for a user to wait for the playing and improving user experience.

In the embodiment of the present invention, as for the file fragment of the "c" film not temporarily stored in the edge cache server, the sending rate of the file fragment may be determined in the following manner: if the file fragment requested by the terminal device is used for playing buffering on the terminal device, determining the sending rate of the file fragment as an expected sending rate, where the expected sending rate is greater than the minimum sending rate of the file fragment.

For example, the edge cache server receives the download request sent by the terminal device for the first time. If the file fragment that is not temporarily stored in the edge cache server is an original file fragment of the file, the edge cache server may increase a sending rate of the original file fragment. For example, if the minimum download rate of the file fragment that is not temporarily stored is 2 Mbps, the rate of the file fragment may be set as the expected sending rate, such as, 4 Mbps or 6 Mbps. The 4 Mbps or 6 Mbps may be used as the sending rate of the file fragment.

It should be noted that, the download request of the terminal device received by the edge cache server may also be a request for the terminal device to re-establish a new link if an established link is disconnected; for example, the edge cache server receives a jump request sent by the terminal device, and if the requested file fragment is not temporarily stored in the edge cache server, the sending rate of the file fragment may be increased. For example, if the minimum downloading rate of the file fragment that is not temporarily stored is 2 Mbps, the sending rate of the file fragment may be set as the expected sending rate, such as, 6 Mbps or 8 Mbps.

It should be noted that, the foregoing examples are only used to describe the present case, and is not limited in the embodiment of the present invention.

In addition, it should be further noted that, if on-demand popularity of the file fragment of the "c" film reaches a preset popularity value, the sending rate of the file fragment may be set as the expected sending rate, and content of the file fragment can be requested at the expected sending rate.

For example, the on-demand popularity of the file fragment of the "c" film reaches a popularity value set by the edge cache server, and the popularity value of the file fragment is temporarily stored. When it is required to temporarily store the file fragment in the edge cache server, the expected sending rate of the file fragment may be carried in the download request sent to a content source server, so as to download the file fragment as soon as possible and temporarily store the file fragment in the edge cache server. When other terminal devices request the file fragment, the edge cache server directly and locally provides the file fragment for other terminal devices, which reduces response time of a terminal device request, and improves user experience.

Step 310: The edge cache server sends the download request to the content source server, where the download request carries the sending rate of the file fragment.

In the embodiment of the present invention, the download request may carry the sending rate of the file fragment in multiple manners.

The expected sending rate and the minimum sending rate of the file fragment may be carried in the download request, such as, x-download-speed:0-16777215=2048000-4096000.

The meanings of the foregoing field are as follows:

x-download-speed indicates that a sending rate of the content to be downloaded is set;

0-16777215 indicates a byte of the file fragment, that is, a size of a complete file fragment;

2048000 indicates the minimum sending rate, that is, 2 Mbps;

4096000 indicates the expected sending rate, that is, 4 Mbps; and 0-16777215=2048000-4096000 indicates that the minimum sending rate of the file fragment is 2 Mbps, and the expected sending rate is 4 Mbps.

A header field of the download request message carries the expected sending rate and the minimum sending rate of the file fragment. This ensures the minimum sending rate of the file fragment when the content source server fails to reach the expected sending rate determined by the edge cache server.

It should be noted that, if the file fragment is large, it is only required that a segment sending rate of the file fragment may be carried in the header field of the download request message when different sending rates are set for different content of the file fragment.

For example, a file fragment occupies 16777215 bytes. It is only required to download content of the first 0-4096000 bytes of the file fragment at the sending rate of 4 Mbps, and it is only required to download content after the 4096000 bytes at the sending rate of 2 Mbps. Then the following field may be carried in the header field of the download request message:

x-download-speed:0-4096000=4096000,4096000-=2048000.

The meanings of the foregoing field are as follows;
x-download-speed indicates that the sending rate of the content to be downloaded is set;

0-4096000 indicates a segment byte of the file fragment, for example, a complete fragment occupies 0-16777215 bytes, and the 0-4096000 indicates the first 4096000 bytes of the file fragment;

4096000, where the 4096000 indicates the sending rate, that is, 4 Mbps;

0-4096000=4096000 indicates that a sending rate of the first 4096000 bytes of the file fragment is 4 Mbps;

4096000- indicates all bytes of the file fragment after the 4096000 bytes;

2048000 indicates the sending rate, that is, 2 Mbps; and

4096000-=2048000 indicates that a sending rate of the last 4096000 bytes of the file fragment is 2 Mbps.

The header field of the download request message carries the segment sending rate of the file fragment. This ensures that the sending rate of the file fragment that needs to be downloaded can be controlled correctly.

In addition, the download request may further carry an expected segment sending rate and a minimum segment sending rate of the file fragment. This ensures the minimum segment sending rate of the file fragment when the content source server fails to reach the expected segment sending rate determined by the edge cache server.

For example, the header field of the download request message may carry the following field:

x-download-speed:0-4096000=2048000-4096000, 4096000-=2048000.

The meanings of the foregoing field are as follows:

x-download-speed indicates that the sending rate of the content to be downloaded is set;

0-4096000 indicates a segment byte of the file fragment, for example, a complete fragment occupies 0-16777215 bytes, and the 0-4096000 indicates the first 4096000 bytes of the file fragment;

2048000 indicates the minimum sending rate, that is, 2 Mbps;

4096000 indicates the expected sending rate, that is, 4 Mbps;

0-4096000=2048000-4096000 indicates that the minimum sending rate of the first 4096000 bytes of the file fragment is 2 Mbps, and the expected sending rate is 4 Mbps;

4096000- indicates all bytes of the file fragment after the 4096000 bytes;

2048000 indicates the sending rate, that is, 2 Mbps; and

4096000-=2048000 indicates that a sending rate of the last 4096000 bytes of the file fragment is 2 Mbps.

The downloading request carries the expected segment sending rate and the minimum sending rate of the file fragment. This ensures the minimum sending rate of the file fragment when the content source server fails to reach the expected sending rate determined by the edge cache server, and ensures that the terminal device can continuously download the file fragment.

Step 312: The content source server sends the file fragment to the edge cache server at the sending rate of the file fragment carried in the download request.

In the embodiment of the present invention, the content source server needs to determine an available bandwidth of a network port, for example, a maximum bandwidth of the network port of the content source server is 10 gigabits (G). If there are 1000 terminal devices performing downloading currently, each of the 500 terminal devices uses an 8 Mbps bandwidth for downloading, and each of the other 500 terminal devices uses a 2 Mbps bandwidth for downloading; a total bandwidth used by the network port is 5 gigabits per second (Gbps). Therefore, the available bandwidth of the content source server is 5 Gbps.

In the embodiment of the present invention, if the available bandwidth is greater than or equal to the sending rate of the file fragment, the file fragment is sent at the sending rate of the file fragment; if the available bandwidth is less than the sending rate of the file fragment, sending the file fragment is refused, so as to prevent a congestion phenomenon from occurring, and affecting download quality of other terminal devices.

It should be noted that, in the embodiment of the present invention, as for the situation that the downloading request of the file fragment carries the expected sending rate and the minimum sending rate of the file fragment, if the available bandwidth is equal to or greater than the expected sending rate of the file fragment, the file fragment is sent at the expected sending rate of the file fragment; if the available bandwidth is greater than the minimum sending rate of the file fragment, and is less than the expected sending rate of the file fragment, the file fragment is sent by using the available bandwidth as the sending rate of the file fragment, so as to improve utilization of a network; and if the available bandwidth is less than the minimum sending rate of the file fragment, sending the file fragment is refused, so as to prevent the congestion phenomenon from occurring, and affecting download quality of other terminal devices.

It should be noted that, in the embodiment of the present invention, as for the situation that the download request of the file fragment carries the segment sending rate of the file fragment, if the available bandwidth is greater than or equal to the segment sending rate of the file fragment, a segment of the file fragment is sent at the segment sending rate of the file fragment; if the available bandwidth is less than the segment sending rate of the file fragment, sending the segment of the file fragment is refused, so as to prevent the congestion phenomenon from occurring, and affecting downloading quality of other terminal devices.

It should be further noted that, in the embodiment of the present invention, as for the situation that the downloading request of the file fragment carries the expected segment sending rate and the minimum segment sending rate of the file fragment, if the available bandwidth is equal to or greater than the expected segment sending rate of the file fragment, the segment of the file fragment is sent at the expected segment sending rate of the file fragment; if the available bandwidth is greater than the minimum segment sending rate of the file fragment, and is less than the expected segment sending rate of the file fragment, the segment of the file fragment is sent by using the available bandwidth as the segment sending rate of the file fragment, so as to improve utilization of a network; and if the available bandwidth is less than the minimum segment sending rate of the file fragment, sending the segment of the file fragment is refused, so as to prevent the congestion phenomenon from occurring, and affecting downloading quality of other terminal devices.

Step 314: The edge cache server forwards, to the terminal device, the received file fragment sent by the content source server.

In the embodiment of the present invention, the edge cache server determines the sending rate of the file fragment by analyzing the status of the file fragment requested to be downloaded, and the sending rate of the file fragment is carried in the request message for downloading the file fragment. Therefore, the content source server can send the file fragment at the sending rate of the file fragment carried in the request message, which solves the problem in the prior art that, an upper-level content source server fails to meet diversified downloading requirements of a lower-level cache server, and the lower-level cache server is capable of providing a flexible streaming service for the terminal device, improving user experience.

Method Embodiment 4

The following uses a CDN in a three-layer networking mode as an example to describe the technical solutions of the present invention.

Figure 4:
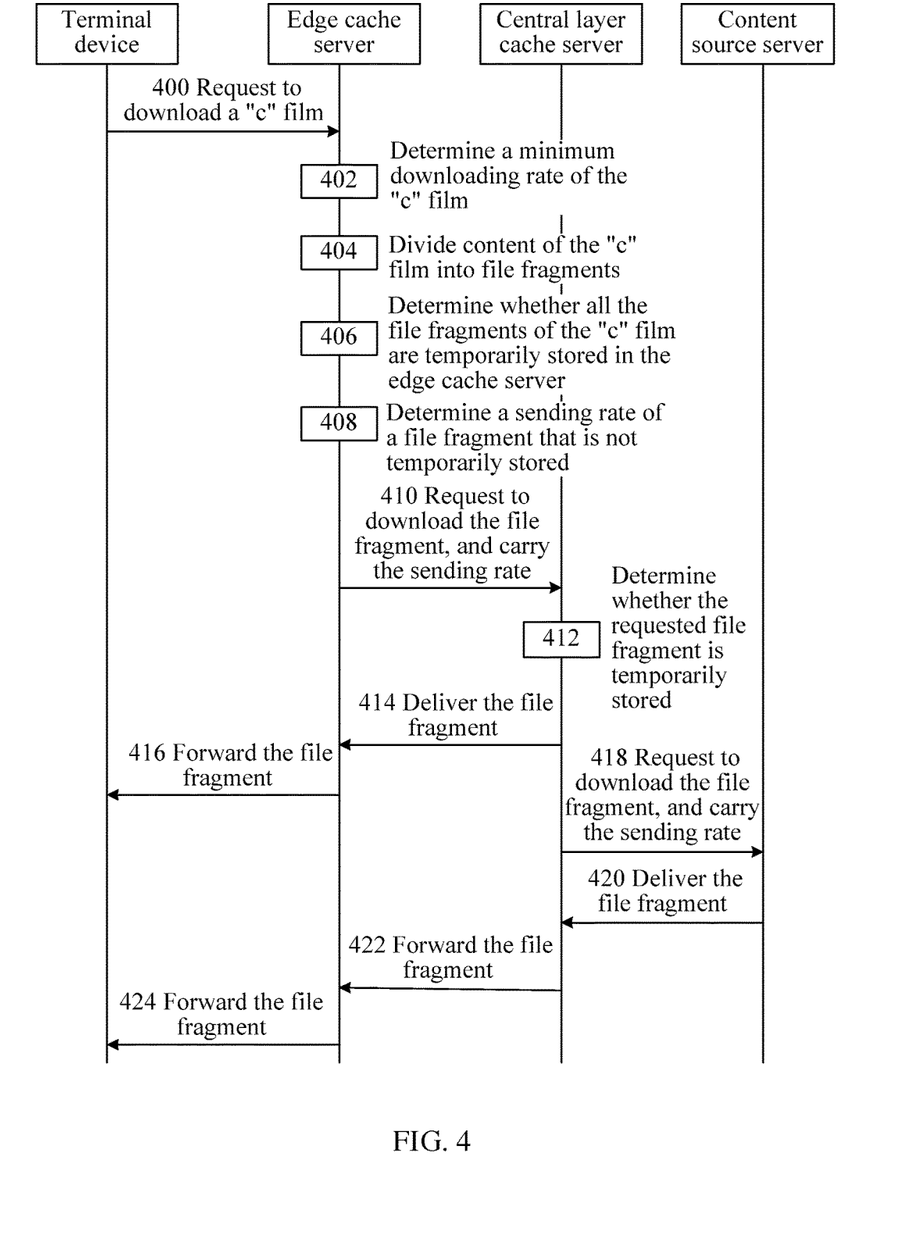
FIG. 4 is a schematic flow chart of another embodiment of a method for downloading a file in a content delivery network according to the embodiment of the present invention.

FIG. 4 is a schematic flow chart of another embodiment of a method for downloading a file in a content delivery network according to the embodiment of the present invention, and as shown in FIG. 4, the method according to the embodiment of the present invention includes the following steps.

Step 400: A terminal device makes a request to an edge cache server for downloading a "c" film.

Step 402: The edge cache server determines a minimum download rate of the "c" film.

The edge cache server may determine a minimum sending rate of the "c" film in a preconfigured manner. The preconfigured manner is described in the Method Embodiment 3, and details are not described in the embodiment again.

Step 404: The edge cache server divides content of the "c" film into file fragments according to the download request of the "c" film.

Step 406: The edge cache server determines whether all the file fragments of the "c" film are temporarily stored in the edge cache server.

Step 408: As for a file fragment of the "c" film that is not temporarily stored in the edge cache server, the edge cache server determines a sending rate of the file fragment.

In the embodiment of the present invention, as for the file fragment of the "c" film that is not temporarily stored in the edge cache server, a manner for determining the sending rate of the file fragment is described in the method embodiment 3, and details are not described in the embodiment again.

Step 410: The edge cache server sends the download request to a central cache server, where the download request carries the sending rate of the file fragment.

In the embodiment of the present invention, a manner in which the download request carries the sending rate of the file fragment is described in the method embodiment 3, and details are not described in the embodiment of the present invention again.

Step 412: The central cache server determines whether the file fragment requested to be downloaded is temporarily stored. If the file fragment requested to be downloaded by the edge cache server is temporarily stored, step 414 and step 416 are executed; if the file fragment requested to be downloaded is not temporarily stored, step 418 to step 424 are executed.

It should be noted that, in the embodiment of the present invention, only one central cache server is available. However, in a practical application, there may be a multi-layered central cache server in a content delivery network. A specific layer is determined according to a specific application scenario. What is presented herein is only an example, which is not limited.

In addition, it should be further noted that, the central cache server may directly provide a user with a service.

Step 414: The central cache server sends the file fragment to the edge cache server at the sending rate of the file fragment carried in the download request.

Step 416: The edge cache server forwards, to the terminal device, the received file fragment sent by the central cache server.

Step 418: Forward the download request of the file fragment to a content source server.

Step 420: The content source server sends the file fragment to the central cache server at the sending rate of the file fragment carried in the download request.

Step 422: The central cache server forwards, to the edge cache server, the received file fragment sent by the content source server.

Step 424: The edge cache server forwards, to the terminal device, the received file fragment sent by the central cache server.

In the embodiment of the present invention, the edge cache server determines the sending rate of the file fragment by analyzing the status of the file fragment requested to be downloaded, and the sending rate of the file fragment is carried in the request message for downloading the file fragment. Therefore, the content source server or an upper-level cache server can send the file fragment at the sending rate of the file fragment carried in the request message, which solves the problem in the prior art that, the upper-level cache server or the content source server fails to meet diversified downloading requirements of a lower-level cache server, and the lower-level cache server is capable of providing a flexible streaming service for the terminal device, improving user experience.

The following describes apparatus embodiments of the present invention.

Apparatus Embodiment 1

Figure 5:
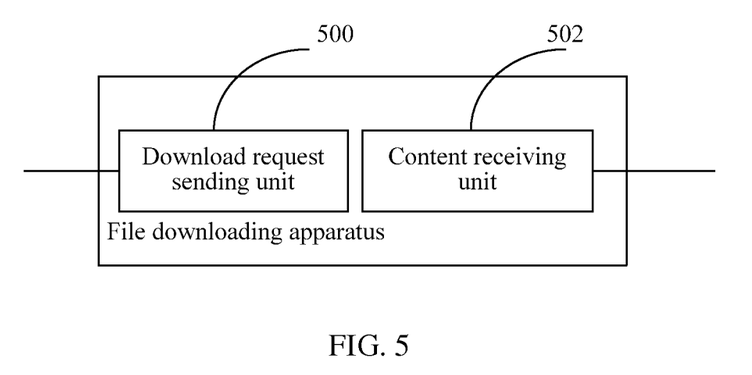
FIG. 5 is a schematic structural diagram of an embodiment of an apparatus for downloading a file in a content delivery network according to the embodiment of the present invention.

FIG. 5 is a schematic structural diagram of an embodiment of an apparatus for downloading a file in a content delivery network according to the embodiment of the present invention, and as shown in FIG. 5, the file downloading apparatus includes a download request sending unit 500 and a content receiving unit 502.

The download request sending unit 500 is configured to send a request message for downloading a file fragment to a content source server or an upper-level cache server, where the request message carries a sending rate of the file fragment, and the sending rate of the file fragment is determined according to a requirement for playing the file fragment.

The content receiving unit 502 is configured to receive the file fragment sent at the sending rate.

In the embodiment of the present invention, the file downloading apparatus determines the sending rate of the file fragment according to the requirement for playing the file fragment, adds the sending rate of the file fragment to the request message for downloading the file fragment and sends the request message to the content source server or the upper-level cache server. Therefore, the content source server or the upper-level cache server can send the file fragment at the sending rate of the file fragment carried in the request message, which solves the problem in the prior art that, the upper-level cache server or the content source server fails to meet diversified downloading requirements of the file downloading apparatus, and the file downloading apparatus is capable of providing a flexible streaming service for the terminal apparatus, improving user experience.

Apparatus Embodiment 2

Figure 6:
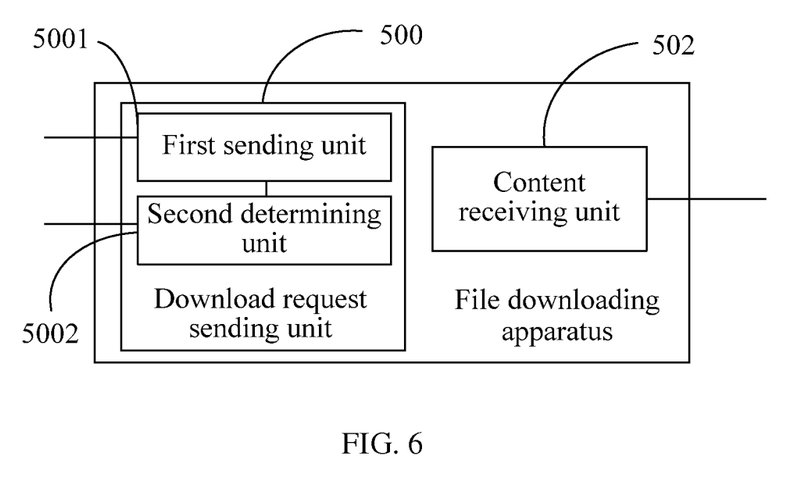
FIG. 6 is a schematic structural diagram of another embodiment of an apparatus for downloading a file in a content delivery network according to the embodiment of the present invention.

FIG. 6 is a schematic structural diagram of another embodiment of an apparatus for downloading a file in a content delivery network according to the embodiment of the present invention, and as shown in FIG. 6, the download request sending unit 500 may include a first sending unit 5001 and a second determining unit 5002.

The first sending unit 5001 is configured to send a request message for downloading a file fragment to a content source server or an upper-level cache server, where the request message carries a sending rate of the file fragment.

The second determining unit 5002 is configured to, when on-demand popularity of the file fragment reaches a preset popularity value or the file fragment is used for playing buffering on a terminal device, determine the sending rate of the file fragment as an expected sending rate, where the expected sending rate is greater than a minimum sending rate of the file fragment.

It should be noted that, the second determining unit 5002 may be further configured to, when the on-demand popularity of the file fragment reaches the preset popularity value or the file fragment is used for playing buffering on the terminal device, determine the sending rate of the file fragment as the expected sending rate, where the expected sending rate is greater than the minimum sending rate of the file fragment; and when the on-demand popularity of the file fragment does not reach the preset popularity value, and the file fragment is not used for playing buffering on the terminal device, use the minimum sending rate of the file fragment as the sending rate of the file fragment, so as to occupy the least bandwidth, and save bandwidth resources under a circumstance that the terminal device plays normally.

In the embodiment of the present invention, the download request may carry the sending rate of the file fragment in one of the following manners.

Manner 1: the request message carries the expected sending rate and the minimum sending rate of the file fragment, where the expected sending rate and the minimum sending rate are used to ensure the minimum sending rate when the expected sending rate cannot be met.

Manner 2: the request message carries a segment sending rate of the file fragment, where the segment sending rate is used to set different sending rates for different content of the file fragment.

Manner 3: the request message carries an expected segment sending rate and a minimum segment sending rate of the file fragment, where the expected segment sending rate and the minimum segment sending rate are used to ensure the minimum segment sending rate when the expected segment sending rate cannot be met.

In the embodiment of the present invention, the sending rate of the file fragment is determined according to a requirement for playing the file fragment. A manner for determining the sending rate of the file fragment may include: if the on-demand popularity of the file fragment reaches the preset popularity value or the file fragment is used for playing buffering on the terminal device, determining the sending rate of the file fragment as the expected sending rate, so that the terminal device may download at a faster rate, which reduces time for a user to wait for playing, and improves user experience.

Apparatus Embodiment 3

Figure 7:
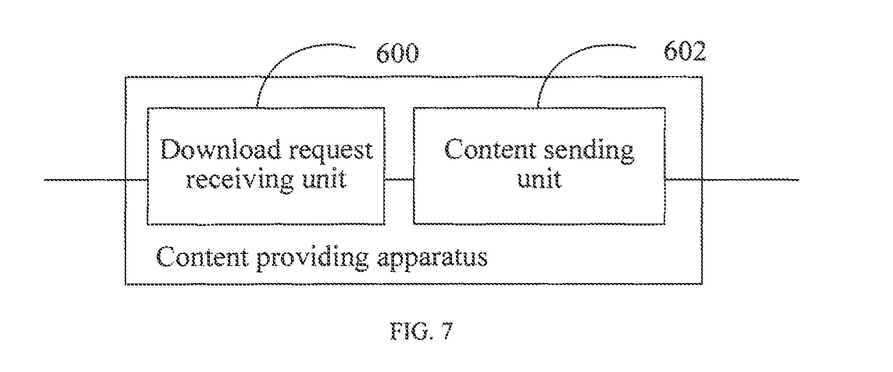
FIG. 7 is a schematic structural diagram of an embodiment of an apparatus for providing content in a content delivery network according to the embodiment of the present invention.

FIG. 7 is a schematic structural diagram of an embodiment of an apparatus for providing content in a content delivery network according to the embodiment of the present invention, and as shown in FIG. 7, the content providing apparatus includes a download request receiving unit 600 and a content sending unit 602.

The download request receiving unit 600 is configured to receive a request message for downloading a file fragment sent by a lower-level cache server, where the request message carries a sending rate of the file fragment, and the sending rate of the file fragment is determined by the lower-level cache server according to a requirement for playing the file fragment.

The content sending unit 602 is connected to the download request receiving unit 600, and the content sending unit 602 is configured to send the file fragment at the sending rate.

In the embodiment of the present invention, the content providing apparatus receives the request message for downloading the file fragment sent by the lower-level cache server, and delivers the file at the file sending rate determined by the lower-level cache server, which provides a flexible streaming service for the lower-level cache server.

Apparatus Embodiment 4

Figure 8:
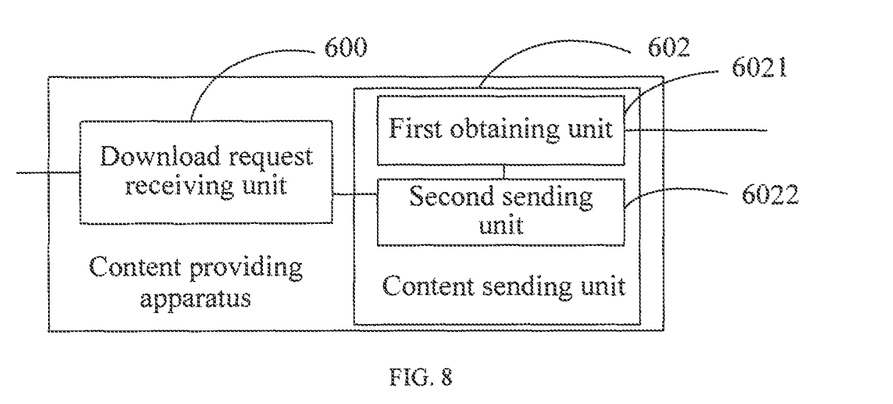
FIG. 8 is a schematic structural diagram of another embodiment of an apparatus for providing content in a content delivery network according to the embodiment of the present invention.

FIG. 8 is a schematic structural diagram of another embodiment of an apparatus for providing content in a content delivery network according to the embodiment of the present invention, and as shown in FIG. 8, a content sending unit 602 includes a first obtaining unit 6021 and a second sending unit 6022.

The first obtaining unit 6021 is configured to obtain an available bandwidth; and the second sending unit 6022 is configured to, when the available bandwidth is greater than or equal to the sending rate of the file fragment, send the file fragment at the sending rate of the file fragment; and when the available bandwidth is less than the sending rate of the file fragment, refuse to send the file fragment.

The second sending unit 6022 is further configured to, when the available bandwidth is equal to or greater than an expected sending rate of the file fragment, send the file fragment at the expected sending rate of the file fragment; when the available bandwidth is greater than a minimum sending rate of the file fragment, and is less than the expected sending rate of the file fragment, send the file fragment by using the available bandwidth as the sending rate of the file fragment; and when the available bandwidth is less than the minimum sending rate of the file fragment, refuse to send the file fragment, so as to prevent a congestion phenomenon from occurring.

In the embodiment of the present invention, by receiving the request message that carries the sending rate of the file fragment to be downloaded and sent by a lower-level cache server, the content providing apparatus delivers the file fragment at the sending rate of the file fragment and a condition of the available bandwidth of the content providing apparatus. This meets diversified downloading requirements of a lower-level cache server and also ensures file download quality of other terminal devices.

In addition, it should be further noted that, the content sending unit 602 is further configured to, when the file fragment is not temporarily stored, forward the request message for downloading the file fragment to a content source server, so that the content source server can send the file fragment at the sending rate.

The following describes system embodiments of the present invention.

System Embodiment 1

Figure 9:
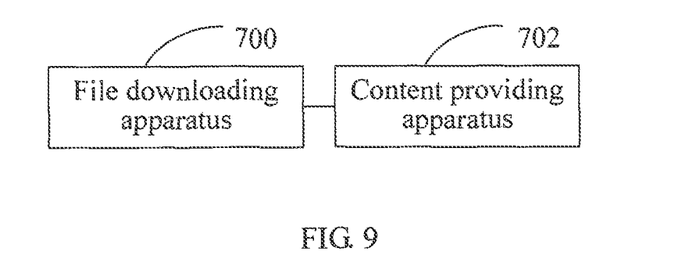
FIG. 9 is a schematic structural diagram of an embodiment of a system for downloading a file in a content delivery network according to the embodiment of the present invention.

FIG. 9 is a schematic structural diagram of an embodiment of a system for downloading a file in a content delivery network according to the embodiment of the present invention, and as shown in FIG. 9, the file downloading system includes a file downloading apparatus 700 and a content providing apparatus 702.

The file downloading apparatus 700 is configured to send a request message for downloading a file fragment to the content providing apparatus 702, where the request message carries a sending rate of the file fragment, and the sending rate of the file fragment is determined according to a requirement for playing the file fragment.

The content providing apparatus 702 is connected to the file downloading apparatus 700, and the content providing apparatus 702 is configured to receive the request message for downloading the file fragment sent by the file downloading apparatus 700, and send the file fragment at the sending rate.

In the embodiment of the present invention, the file downloading apparatus determines the sending rate of the file fragment requested to be downloaded according to the requirement for playing the file fragment, and adds the sending rate of the file fragment to the file downloading request message and send the request message to the content providing apparatus, and the content providing apparatus delivers the file fragment at the sending rate of the file fragment. This meets diversified downloading requirements of the file downloading apparatus, enables the file downloading apparatus to provide a flexible streaming service for a terminal apparatus, and improves user experience.

A manner for determining the sending rate of the file fragment may further include: when on-demand popularity of the file fragment reaches a preset popularity value or the file fragment is used for playing buffering on the terminal device, determining the sending rate of the file fragment as an expected sending rate, where the expected sending rate is greater than a minimum sending rate of the file fragment; when the on-demand popularity of the file fragment does not reach the preset popularity value, and the file fragment is not used for playing buffering on the terminal device, using the minimum sending rate of the file fragment as the sending rate of the file fragment, so as to occupy the least bandwidth, and save bandwidth resources under a circumstance that the terminal device plays normally.

In addition, in the embodiment of the present invention, the request message may carry the sending rate of the file fragment in one of the following manners.

Manner 1: the request message carries the expected sending rate and the minimum sending rate of the file fragment, where the expected sending rate and the minimum sending rate are used to ensure the minimum sending rate when the expected sending rate cannot be met.

Manner 2: the request message carries a segment sending rate of the file fragment, where the segment sending rate is used to set different sending rates for different content of the file fragment.

Manner 3: the request message carries an expected segment sending rate and a minimum segment sending rate of the file fragment, where the expected segment sending rate and the minimum segment sending rate are used to ensure the minimum segment sending rate when the expected segment sending rate cannot be met.

It should be further noted that, in the embodiment of the present invention, the file fragment may be sent at the sending rate in one of the following manners.

Manner 1: obtaining an available bandwidth, if the available bandwidth is greater than or equal to the sending rate of the file fragment, sending the file fragment at the sending rate of the file fragment; and if the available bandwidth is less than the sending rate of the file fragment, refusing to send the file fragment, so as to prevent a congestion phenomenon from occurring, and affecting downloading quality of other terminal devices.

Manner 2: obtaining the available bandwidth, if the available bandwidth is equal to or greater than the expected sending rate of the file fragment, delivering the file fragment at the expected sending rate of the file fragment; if the available bandwidth is greater than the minimum sending rate of the file fragment, and is less than the expected sending rate of the file fragment, sending the file fragment by using the available bandwidth as the sending rate of the file fragment, so as to improve utilization of a network; and if the available bandwidth is less than the minimum sending rate of the file fragment, refusing to send the file fragment, so as to prevent a congestion phenomenon from occurring, and affecting downloading quality of other terminal devices.

Manner 3: obtaining the available bandwidth, if the available bandwidth is greater than or equal to the segment sending rate of the file fragment, sending a segment of the file fragment at the segment sending rate of the file fragment; and if the available bandwidth is less than the segment sending rate of the file fragment, refusing to send the segment of file fragment, so as to prevent a congestion phenomenon from occurring, and affecting downloading quality of other terminal devices.

System Embodiment 2

Figure 10:
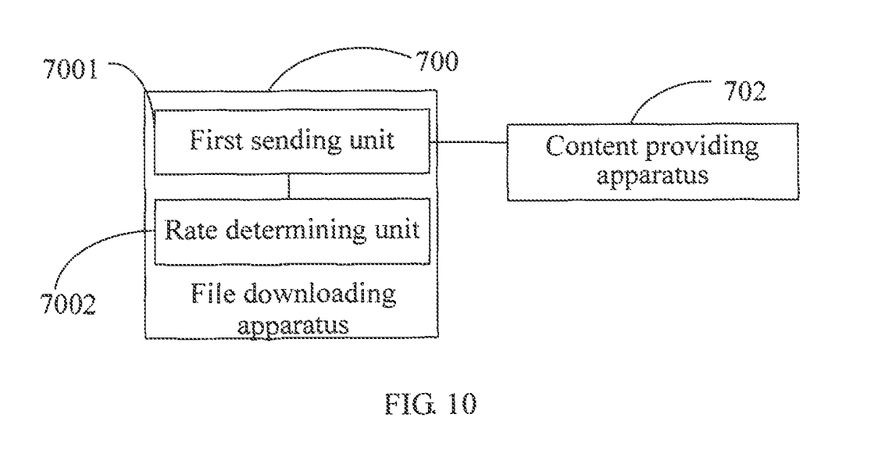
FIG. 10 is a schematic structural diagram of another embodiment of a system for downloading a file in a content delivery network according to the embodiment of the present invention.

FIG. 10 is a schematic structural diagram of another embodiment of a system for downloading a file in a content delivery network according to the embodiment of the present invention, and as shown in FIG. 10, the file downloading system includes a file downloading apparatus 700 that may include a first sending unit 7001 and a rate determining unit 7002.

The first sending unit 7001 is configured to send a request message for downloading a file fragment to a content providing apparatus 702, where the request message carries a sending rate of the file fragment.

The rate determining unit 7002 is configured to, when on-demand popularity of the file fragment reaches a preset popularity value or the file fragment is used for playing buffering on a terminal device, determine the sending rate of the file fragment as an expected sending rate, where the expected sending rate is greater than a minimum sending rate of the file fragment.

In the embodiment of the present invention, the file downloading apparatus determines the sending rate of the file fragment according to a specific requirement for playing the file fragment, so as to provide a flexible streaming service for the terminal device.

It should be noted that, in the embodiment of the present invention, the request message further carries the minimum sending rate of the file fragment, where the minimum sending rate is used for a content source server or an upper-level cache server to ensure the minimum sending rate when the expected sending rate cannot be met.

System Embodiment 3

Figure 11:
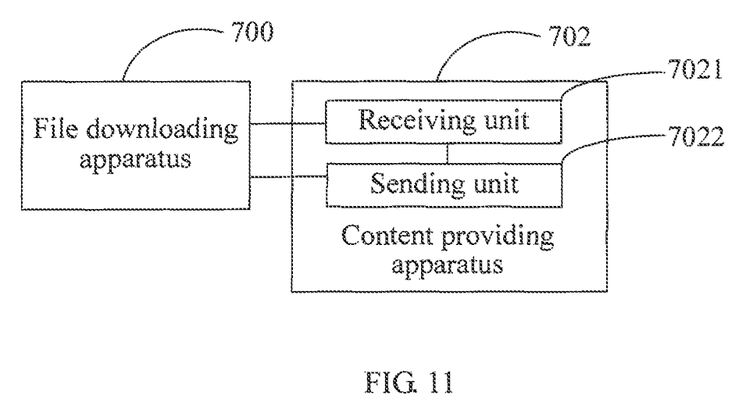
FIG. 11 is a schematic structural diagram of another embodiment of a system for downloading a file in a content delivery network according to the embodiment of the present invention.

FIG. 11 is a schematic structural diagram of another embodiment of a system for downloading a file in a content delivery network according to the embodiment of the present invention, and as shown in FIG. 11, a content providing apparatus 702 includes a receiving unit 7021 and a sending unit 7022.

The receiving unit 7021 is configured to receive a request message for downloading a file fragment sent by a file downloading apparatus 700.

The sending unit 7022 is configured to obtain an available bandwidth, when the available bandwidth is equal to or greater than an expected sending rate of the file fragment, send the file fragment at the expected sending rate of the file fragment; when the available bandwidth is greater than a minimum sending rate of the file fragment, and is less than the expected sending rate of the file fragment, send the file fragment by using the available bandwidth as the sending rate of the file fragment; and when the available bandwidth is less than the minimum sending rate of the file fragment, refuse to send the file fragment.

In the embodiment of the present invention, the content providing apparatus determines the sending rate of the file fragment at the sending rate carried in a downloading request of the file fragment and an available bandwidth provided by the content providing apparatus. This prevents a congestion phenomenon from occurring and also improves utilization of a network, ensures downloading quality of other terminal devices, and improves user experience.

A person of ordinary skill in the art may appreciate that, in combination with the examples described in the embodiments disclosed in this specification, units and steps may be implemented by electronic hardware, computer software, or a combination thereof. In order to clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It can be clearly understood by a person skilled in the art that, for the purpose of convenient and brief description, for a detailed working process of the foregoing system, apparatus and unit, reference may be made to the corresponding process in the method embodiments, and the details will not be described herein again.

It should be understood that, the system, device and method disclosed in the embodiments provided in the application may be implemented in other manners. For example, the device embodiments described above are merely exemplary, for example, the unit division is merely a kind of logic function division, and other division manners can be available in practical implementation, for example, multiple units may be combined with or integrated to another system, or some features may be ignored, or not executed. In addition, the shown or discussed coupling with each other or direct coupling or a communications connection may be indirect coupling or a communications connection through some interfaces, devices and units, or may also be an electrical and mechanic connection or connections in other forms.

The units described as separate parts may or may not be physically separate, and the parts displayed as units may or may not be physical units, may be located in one position, or may be distributed on a plurality of network units. A part or all of the units herein may be selected according to the actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any equivalent modification or replacement figured out by a person skilled in the art within the technical scope of the present invention shall fall within the protection scope of the present invention. Therefore, the protection scope of the present invention shall be subject to the protection scope of the claims.

What is claimed is:

1. A method for downloading a file in a content delivery network, comprising:
    sending a request message for downloading a file fragment to a content source server or an upper-level cache server, wherein the request message carries a sending rate of the file fragment, wherein the sending rate of the file fragment is determined according to a requirement for playing the file fragment, wherein the file fragment comprises multiple file fragment segments, and wherein a header of the request message carries information that specifies a different segment sending rate for each of the multiple file fragment segments in the file fragment; and
    receiving the file fragment sent at the sending rate,
    wherein the request message comprises an expected segment sending rate and a minimum segment sending rate for at least one of the multiple file fragment segments,
    wherein the at least one of the multiple file fragment segments is sent at the expected segment sending rate when an available bandwidth is equal to or greater than the expected segment sending rate,
    wherein the at least one of the multiple file fragment segments is sent using the available bandwidth when the available bandwidth is greater than the minimum segment sending rate and is less than the expected segment sending rate, and
    wherein the at least one of the multiple file fragment segments is refused from being sent when the available bandwidth is less than the minimum segment sending rate of the file fragment.

2. The method according to claim 1, wherein the sending rate of the file fragment is determined according to the requirement for playing the file fragment comprises determining the sending rate of the file fragment as an expected sending rate when on-demand popularity of the file fragment reaches a preset popularity value or the file fragment is used for playing buffering on a terminal device, and wherein the expected sending rate is greater than a minimum sending rate of the file fragment.

3. The method according to claim 2, wherein the method further comprises using the minimum sending rate of the file fragment as the sending rate of the file fragment when the on-demand popularity of the file fragment does not reach the preset popularity value, and the file fragment is not used for playing buffering on the terminal device.

4. The method according to claim 2, wherein the request message further carries the minimum sending rate of the file fragment, and wherein the minimum sending rate is used to ensure the minimum sending rate when the expected sending rate is not met.

5. The method according to claim 1, wherein the download request message comprises a prefix, and wherein the sending rate of the file fragment is further determined according to the prefix of the download request message.

6. The method according to claim 5, wherein the prefix comprises 480, 720, or 1080, and wherein the prefix is preconfigured on an edge server.

7. The method according to claim 1, wherein the segment sending rate for a first segment is higher than the segment sending rates for subsequent segments.

8. A method for downloading a file in a content delivery network, comprising:
    receiving a request message for downloading a file fragment sent by a lower-level cache server, wherein the request message carries a sending rate of the file fragment, wherein the sending rate of the file fragment is determined by the lower-level cache server according to a requirement for playing the file fragment, wherein the file fragment comprises multiple file fragment segments, and wherein a header of the request message carries information that specifies a different segment sending rate for each of the multiple file fragment segments in the file fragment; and
    sending the file fragment at the sending rate,
    wherein the request message comprises an expected segment sending rate and a minimum segment sending rate for at least one of the multiple file fragment segments,
    wherein the at least one of the multiple file fragment segments is sent at the expected segment sending rate when an available bandwidth is equal to or greater than the expected segment sending rate,
    wherein the at least one of the multiple file fragment segments is sent using the available bandwidth when the available bandwidth is greater than the minimum segment sending rate and is less than the expected segment sending rate, and
    wherein the at least one of the multiple file fragment segments is refused from being sent when the available bandwidth is less than the minimum segment sending rate of the file fragment.

9. The method according to claim 8, wherein the sending rate of the file fragment is determined by the lower-level cache server according to the requirement for playing the file fragment comprises determining, by the lower-level cache server, the sending rate of the file fragment as an expected sending rate when on-demand popularity of the file fragment reaches a preset popularity value or the file fragment is used for playing buffering on a terminal device, and wherein the expected sending rate is greater than a minimum sending rate of the file fragment.

10. The method according to claim 9, wherein the method further comprises using, by the lower-level cache server, the minimum sending rate of the file fragment as the sending rate of the file fragment when the on-demand popularity of the file fragment does not reach the preset popularity value, and the file fragment is not used for playing buffering on the terminal device.

11. The method according to claim 9, wherein the request message further carries the minimum sending rate of the file fragment, and wherein the minimum sending rate is used for a content source server or an upper-level cache server to ensure the minimum sending rate when the expected sending rate is not met.

12. An apparatus for downloading a file in a content delivery network, comprising:
- a non-transitory computer readable medium having instructions stored thereon; and
- a computer processor coupled to the non-transitory computer readable medium and configured to:
  - send a request message for downloading a file fragment to a content source server or an upper-level cache server, wherein the request message carries a sending rate of the file fragment, wherein the sending rate of the file fragment is determined according to a requirement for playing the file fragment, wherein the file fragment comprises multiple file fragment segments, and wherein a header of the request message carries information that specifies a different segment sending rate for each of the multiple file fragment segments in the file fragment; and
  - receive the file fragment sent at the sending rate,
  - wherein the request message comprises an expected segment sending rate and a minimum segment sending rate for at least one of the multiple file fragment segments,
  - wherein the at least one of the multiple file fragment segments is sent at the expected segment sending rate when an available bandwidth is equal to or greater than the expected segment sending rate,
  - wherein the at least one of the multiple file fragment segments is sent using the available bandwidth when the available bandwidth is greater than the minimum segment sending rate and is less than the expected segment sending rate, and
  - wherein the at least one of the multiple file fragment segments is refused from being sent when the available bandwidth is less than the minimum segment sending rate of the file fragment.

13. The apparatus according to claim 12, wherein the computer processor is further configured to execute the instructions to:
- send the request message for downloading the file fragment to the content source server or the upper-level cache server, wherein the request message carries the sending rate of the file fragment; and
- determine the sending rate of the file fragment as an expected sending rate when on-demand popularity of the file fragment reaches a preset popularity value or the file fragment is used for playing buffering on a terminal device, and
- wherein the expected sending rate is greater than a minimum sending rate of the file fragment.

14. The apparatus according to claim 12, wherein the computer processor is further configured to execute the instructions to:
- send the request message for downloading the file fragment to the content source server or the upper-level cache server, wherein the request message carries the sending rate of the file fragment;
- determine the sending rate of the file fragment as an expected sending rate when on-demand popularity of the file fragment reaches a preset popularity value or the file fragment is used for playing buffering on a terminal device, wherein the expected sending rate is greater than a minimum sending rate of the file fragment; and
- use the minimum sending rate of the file fragment as the sending rate of the file fragment when the on-demand popularity of the file fragment does not reach the preset popularity value, and the file fragment is not used for playing buffering on the terminal device.

15. The apparatus according to claim 13, wherein the request message further carries the minimum sending rate of the file fragment, and wherein the minimum sending rate is used for the content source server or the upper-level cache server to ensure the minimum sending rate when the expected sending rate is not met.

16. A system for downloading a file in a content delivery network, comprising:
- a file downloading apparatus; and
- a content providing apparatus,
  - wherein the file downloading apparatus is configured to send a request message for downloading a file fragment to the content providing apparatus,
  - wherein the request message carries a sending rate of the file fragment,
  - wherein the sending rate of the file fragment is determined according to a requirement for playing the file fragment,
  - wherein the file fragment comprises multiple file fragment segments,
  - wherein a header of the request message carries information that specifies a different segment sending rate for each of the multiple file fragment segments in the file fragment,
  - wherein the content providing apparatus is configured to receive the request message for downloading the file fragment sent by the file downloading apparatus, and send the file fragment at the sending rate,
  - wherein the request message comprises an expected segment sending rate and a minimum segment sending rate for at least one of the multiple file fragment segments,
  - wherein the at least one of the multiple file fragment segments is sent at the expected segment sending rate when an available bandwidth is equal to or greater than the expected segment sending rate,
  - wherein the at least one of the multiple file fragment segments is sent using the available bandwidth when the available bandwidth is greater than the minimum segment sending rate and is less than the expected segment sending rate, and
  - wherein the at least one of the multiple file fragment segments is refused from being sent when the available bandwidth is less than the minimum segment sending rate of the file fragment.

17. The system according to claim 16, wherein the file downloading apparatus is further configured to:
- send the request message for downloading the file fragment to the content providing apparatus, wherein the request message carries the sending rate of the file fragment;
- determine the sending rate of the file fragment as an expected sending rate when on-demand popularity of the file fragment reaches a preset popularity value or the file fragment is used for playing buffering on a terminal device, wherein the expected sending rate is greater than a minimum sending rate of the file fragment; and
- use the minimum sending rate of the file fragment as the sending rate of the file fragment when the on-demand popularity of the file fragment does not reach the preset popularity value, and the file fragment is not used for the playing buffering of the terminal device.

* * * * *